(12) United States Patent
Harata et al.

(10) Patent No.: US 7,661,324 B2
(45) Date of Patent: Feb. 16, 2010

(54) MAGNETOSTRICTIVE TORQUE SENSOR AND ELECTRIC POWER STEERING APPARATUS

(75) Inventors: Hitoshi Harata, Tochigi (JP); Yuichi Fukuda, Tochigi (JP); Yukiya Kashimura, Tochigi (JP); Mizuho Doi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/143,588

(22) Filed: Jun. 20, 2008

(65) Prior Publication Data

US 2008/0314163 A1 Dec. 25, 2008

(30) Foreign Application Priority Data

Jun. 22, 2007 (JP) ............................. 2007-164979

(51) Int. Cl.
*G01L 3/00* (2006.01)
(52) U.S. Cl. ............................................. 73/862.333
(58) Field of Classification Search ............ 73/862.321, 73/862.325, 862.331, 862.333, 862.335
See application file for complete search history.

(56) References Cited

U.S. PATENT DOCUMENTS

| 4,506,554 | A | 3/1985 | Blomkvist et al. | |
|---|---|---|---|---|
| 4,627,298 | A | 12/1986 | Sahashi et al. | |
| 6,966,232 | B2* | 11/2005 | Asaumi et al. | 73/862.333 |
| 7,497,132 | B2* | 3/2009 | Harata et al. | 73/862.335 |
| 2001/0035056 | A1* | 11/2001 | Garshelis | 73/862.336 |
| 2004/0107781 | A1* | 6/2004 | Asaumi et al. | 73/862.333 |
| 2009/0049931 | A1* | 2/2009 | Asaumi et al. | 73/862.333 |

FOREIGN PATENT DOCUMENTS

| EP | 0 366 217 A2 | 1/1989 |
|---|---|---|
| EP | 0 366 217 A3 | 1/1989 |
| JP | 2004-191068 A | 7/2004 |

OTHER PUBLICATIONS

Sasada et al., Torgue Transducers with Stress-Sensitive Amorphous Ribbons of Chevron-Pattern, IEEE Transactions on Magnetics, Sep. 1984, pp. 951-953, vol. MAG-20 No. 5, part 1, New York, US.

* cited by examiner

*Primary Examiner*—Lisa M Caputo
*Assistant Examiner*—Freddie Kirkland, III
(74) *Attorney, Agent, or Firm*—Arent Fox LLP.

(57) ABSTRACT

This magnetostrictive torque sensor 10 includes a rotating shaft 11 used to rotate according to an input torque and provided with magnetostrictive films 14A and 14B, an excitation coil 12 configured to apply an alternating magnetic field 31 to the magnetostrictive film, and detection coils 13A and 13B each of which detects a change in the magnetic characteristic of an associated one of the magnetostrictive films. The magnetostrictive torque sensor is configured so that a bias magnetic field is added to the alternating magnetic field from a bias power supply 17 so as to satisfy the following conditions:

$H_m < H_{in} < H_n$; and $-H_m > -H_{in} > -H_n$ where $H_m$ (>0) is an applied magnetic field corresponding to a maximum magnetic permeability obtained according to a magnetic hysteresis curve 34 of the magnetostrictive film, which shows magnetization caused by the alternating magnetic field, $H_n$ (>0) is an applied magnetic field corresponding to an end of a range in which a discontinuous magnetization is performed, and $H_{in}$ (>0) is an applied magnetic field that determines a sensitivity range to be set on a magnetostrictive sensitivity curve representing a magnetostrictive sensitivity exhibited by the magnetostrictive film.

5 Claims, 9 Drawing Sheets

MAGNETOSTRICTIVE TORQUE SENSOR AND ELECTRIC POWER STEERING APPARATUS

BACKGROUND OF THE INVENTION

The present invention relates to a magnetostrictive torque sensor and to an electric power steering apparatus. More particularly, the invention relates to a magnetostrictive torque sensor for detecting a torque, which is applied to a steering shaft and so on, utilizing a magnetic change based on a magnetostrictive action occurring in a magnetostrictive film, and to an electric power steering apparatus utilizing the magnetostrictive torque sensor.

For example, in an electric power steering apparatus equipped as a steering system of an automobile, a steering torque added to a steering shaft from a steering wheel by a driver's steering operation is generally detected by a steering torque detecting portion. In recent years, a device constituted utilizing a magnetostrictive torque sensor has been known as the steering torque detecting portion. The steering shaft is a rotating shaft that receives a torque generated by a driver's steering operation so as to rotate and that functions as a rotating shaft in the steering torque detecting portion. The electric power steering apparatus drive-controls a motor for assisting a steering force in response to a torque signal detected through the steering torque detecting portion. Thus, the electric power steering apparatus reduces a driver's steering force so as to give the driver a comfortable steering feeling.

The principle of detecting a torque, which is employed by a magnetostrictive torque sensor functioning as a steering torque detecting portion, is described below with reference to the accompanying drawings. Actually, the magnetostrictive torque sensor is constituted as a sensor device, which includes an intrinsic sensor part, which is sensitive to a torque, and a detecting electric circuit part that processes a sensor output signal.

In the magnetostrictive torque sensor, magnetostrictive films are formed on a surface of a steering shaft (rotating shaft) 101 over the entire circumference along a shaft center line, for example, magnetostrictive films 102A and 102B are formed at two places thereon so as to have opposite magnetic anisotropies 103 and 104, as illustrated in FIG. 10. The magnetostrictive film 102A has a positive magnetostriction constant, while the magnetostrictive film 102B has a negative magnetostriction constant. The magnetostrictive torque sensor 100 has a sensor configuration enabled so that when an input torque acts upon the steering shaft 101 from a steering wheel, as indicated by arrows 105, a change in the magnetostrictive characteristic of each of the magnetostrictive films 102A and 102B is contactlessly detected by an associated one of detection coils 106A and 106B. The detection coil 106A is disposed around the magnetostrictive film 102A to surround the magnetostrictive film 102A. The detection coil 106B is disposed around the magnetostrictive film 102B to surround the magnetostrictive film 102B.

In the aforementioned torque sensor, a change in the magnetostrictive characteristic of each of the magnetostrictive films 102A and 102B is detected by an associated one of detection coils 106A and 106B. Thus, upon detection of the change, for example, the detection coils 106A and 106B are supplied with sinusoidal wave alternating currents so as to be excited. Excitation sinusoidal wave alternating currents are applied to the detection coils 106A and 106B, respectively. Consequently, alternating magnetic fields are applied to the associated magnetostrictive films 102A and 102B, respectively. Although an example of using the detection coils as excitation coils has been described, the magnetostrictive torque sensor can be configured to use excitation coils separately from the detection coils. In either case, excitation coils for applying alternating magnetic fields to magnetostrictive films are required.

FIG. 11 illustrates the principle of detecting an input torque an input-torque/output according to the configuration of a sensor device that is the magnetostrictive torque sensor 100. A characteristic VT1 is an input torque characteristic produced on the basis of an output signal of the detection coil 106A. A characteristic VT2 is an input torque characteristic produced on the basis of an output signal of the detection coil 106B. The direction of the magnetic anisotropy 103 of the magnetostrictive film 102A is opposite to that of the magnetic anisotropy 104 of the magnetostrictive film 102B. Thus, the direction of inclination of a line representing the characteristic VT1 is opposite to that of inclination of a line representing the characteristic VT2. A characteristic VT3 is an input torque output characteristic produced by calculating the difference between the characteristics VT1 and VT2. An artificial input torque applied to the steering shaft is obtained according to the characteristic VT3. Actually, a point B on a curve representing the characteristic VT3 is set as an origin. A right-side area on the right side of the point B is set as a positive area. A left-side area on the left side of the point B is set as a negative area. According to the characteristic VT3, information on the rotational direction and the magnitude of an input torque to be applied to the steering shaft is obtained.

A conventional magnetostrictive torque sensor is described in Patent Document 1. The magnetostrictive torque sensor described in Patent Document 1 adds an output of a detection coil upon excitation of an excitation coil to a reference signal. The phase of an addition value representing a result of this addition is compared with that of the reference signal. A comparison output representing a comparison result is converted into a voltage. Based on the polarity and the magnitude of the obtained voltage, the direction and the magnitude of a torque to be applied to a torque transmission shaft are detected.

[Patent Document 1] JP-A-2004-191068

In the conventional magnetostrictive torque sensor, a magnetic moment is rotated towards an input direction by a twist torque. A change in the magnetic moment affects the sensitivity of the sensor. Although the sensitivity of the magnetostrictive torque sensor is determined by the product of the magnetostrictive constant and the magnetic permeability of a material, the magnetic characteristic of an initial magnetostrictive film depends upon the material thereof, a manufacturing technique therefor, and a substrate to which the magnetostrictive film is attached. Thus, considerable studies of processes are required to obtain the high-level and less-variation sensitivity of the material, which are determined in the sensor. Variation of the sensitivity of the sensor occurs due to earth magnetism and a disturbance magnetic field caused when a vehicle crosses a railway crossing, or the like, depending upon use environment. However, the processes assuming such a fact have not sufficiently been studied until now.

In a case where the magnetostrictive torque sensor is used as a steering torque detecting portion of the magnetostrictive torque sensor, particularly, highly-functional and less-variation torque sensors are desired. Additionally, a magnetostrictive film having a high signal-to-noise (SN) ratio, which is provided in the magnetostrictive torque sensor, is desired in consideration of high grade steering performance and a threshold margin in a fail safe mode in the electric power steering apparatus.

SUMMARY OF THE INVENTION

An object of the invention is to solve the aforementioned problems, to provide a magnetostrictive torque sensor capable of achieving a high-level and less-variation sensitivity in consideration of disturbances, earth magnetism and a disturbance magnetic field caused when a vehicle crosses a railway crossing, and also capable of having a high SN ratio when utilized in an electric power steering apparatus, in consideration of high-grade steering performance and a threshold margin in a fail safe mode, and to provide an electric power steering apparatus constituted utilizing the magnetostrictive torque sensor.

To achieve the foregoing object, a magnetostrictive torque sensor according to the invention and an electric power steering apparatus according to the invention are constituted as follows.

According to a first aspect of the invention, there is provided a magnetostrictive torque sensor including:

a rotating shaft that is used to rotate according to an input torque and that is provided with a magnetostrictive film, an excitation coil that applies an alternating magnetic field to the magnetic film, and a detection coil that detects a change in a magnetic characteristic of the magnetostrictive film, wherein a bias magnetic field is added to the alternating magnetic field so as to satisfy the following conditions:

$H_m < H_{in} < H_n$; and $-H_m > -H_{in} > -H_n$ where $H_m$ (>0) is an applied magnetic field corresponding to a maximum magnetic permeability obtained according to a magnetic hysteresis curve of the magnetostrictive film, which shows magnetization caused by the alternating magnetic field, $H_n$ (>0) is an applied magnetic field corresponding to an end of a range in which a discontinuous magnetization is performed, and $H_{in}$ (>0) is an applied magnetic field that determines a sensitivity range to be set on a magnetostrictive sensitivity curve representing a magnetostrictive sensitivity exhibited by the magnetostrictive film.

According to the magnetostrictive torque sensor of the first aspect, an appropriate offset magnetic field to the magnetostrictive film of the rotating shaft by adding a bias magnetic field using an excitation current from, for example, an excitation coil.

Accordingly, a high-magnetic-permeability area of the magnetostrictive film can be used as a sensor. Further, the sensitivity of the sensor can be enhanced without changing the gain of a detecting circuit. Consequently, the SN ratio at the side of the detecting circuit of the magnetostrictive torque sensor can be improved. A maximum sensitivity of the magnetostrictive film can be obtained by applying the offset magnetic field thereto.

According to a second aspect of the invention, there is provided the magnetostrictive torque sensor according to the first aspect, wherein the bias magnetic field is added thereto so as to satisfy the following conditions:

$(H_m+H_{ex}+H_{mag}) < H_{in} < (H_n-H_{ex}-H_{mag})$; and $-(H_m+H_{ex}+H_{mag}) > -H_{in} > -(H_n-H_{ex}-H_{mag})$ where $H_{ex}$ (>0) is a magnetic field due to a disturbance element capable of affecting a magnetic characteristic of the magnetostrictive film, and $H_{mag}$ (>0) is a magnetic field due to earth magnetism.

According to the magnetostrictive torque sensor of the second aspect, the influence of characteristic parameters, such as magnetic field disturbance factors and earth magnetism, can be reduced by applying the offset magnetic field thereto. Consequently, a less-variation magnetostrictive torque sensor can be obtained.

According to a third aspect of the invention, there is provided the magnetostrictive torque sensor of the first or second aspect, wherein the bias magnetic field is given via the excitation coil by adding a bias current to the alternating current.

According to a forth aspect of the invention, there is provided the magnetostrictive torque sensor of the first or second aspect, wherein the bias magnetic field is given by another magnetic field generator.

According to a fifth aspect of the invention, there is provided an electric power steering apparatus including:

a steering torque detecting portion for detecting a steering torque applied to a steering shaft of the steering apparatus, and a controller that drive-controls a motor which gives an assist torque to the steering shaft according to a steering torque detected by the steering torque detecting portion, wherein the magnetostrictive torque sensors of any one of the first to forth aspects is used as the steering torque detecting portion, and the steering shaft serves as the rotating shaft of the magnetostrictive torque sensor.

The invention has the following advantages.

According to the magnetostrictive torque sensor of the invention, the maximum sensitivity of the magnetostrictive film can be obtained on the basis of the applied magnetic field in a range determined by $H_m$ and $H_n$, which are obtained from the magnetic hysteresis curve of the used magnetostrictive film. In addition, the influence of the characteristic parameters, such as the disturbance caused at the railway crossing and the earth magnetism, is reduced. Thus, a high-sensitivity and less-variation magnetostrictive torque sensor can be obtained.

According to the electric power steering apparatus of the invention, the SN ratio of the magnetostrictive film of the magnetostrictive torque sensor, which is used as the steering torque detecting portion, is enhanced. Thus, high-grade steering performance can be achieved. A threshold margin can appropriately be set in a fail safe mode.

BRIEF DESCRIPTION OF THE DRAWINGS

FIG. 1 is a partly cross-sectional side view illustrating a fundamental configuration of a magnetostrictive torque sensor according to the invention.

FIG. 2 is a side view conceptually illustrating an electric circuit of the magnetostrictive torque sensor.

FIG. 3 is a graph illustrating a magnetostrictive characteristic curve relating to each detection coil of the magnetostrictive torque sensor and a sensor detecting characteristic.

FIG. 4 is a graph illustrating the relationship among an alternating magnetic field, a bias magnetic field, and an offset magnetic field.

FIG. 5 is a graph illustrating an applied magnetic field $H_m$, at which a maximum magnetic permeability is obtained according to a magnetic hysteresis curve, and an applied magnetic field $H_n$ at an end of a range in which a discontinuous magnetization is performed.

FIG. 6 is a graph illustrating a range, in which "$H_m < H_{in} < H_n$", and a range, in which "$-H_m > -H_{in} > -H_n$", of a coil applying magnetic field represented by an abscissa axis of an "applied-magnetic-field/normalized-sensitivity" characteristic curve.

FIG. 7 is a schematic view illustrating the configuration of an electric power steering apparatus.

FIG. 8 is a graph illustrating a range, in which "$(H_m+H_{ex}+H_{mag}) < H_{in} < (H_n-H_{ex}-H_{mag})$", and a range, in which "$-(H_m+H_{ex}+H_{mag}) > -H_{in} > -(H_n-H_{ex}-H_{mag})$", of a coil applying magnetic field represented by an abscissa axis of an "applied-magnetic-field/normalized-sensitivity" characteristic curve.

FIG. 9 is a view that is similar to FIG. 2 and that illustrates another modification for applying an offset magnetic field to a magnetostrictive film.

FIG. 10 is a side view illustrating the configuration of a primary part of a conventional general magnetostrictive torque sensor.

FIG. 11 is a graph illustrating an input-torque/output characteristic for explaining the principle of detecting an input torque, using the conventional magnetostrictive torque sensor.

DETAILED DESCRIPTION OF THE PREFERRED EMBODIMENTS

Hereinafter, a preferred embodiment (example) according to the invention is described with reference to the accompanying drawings.

Figure 1:
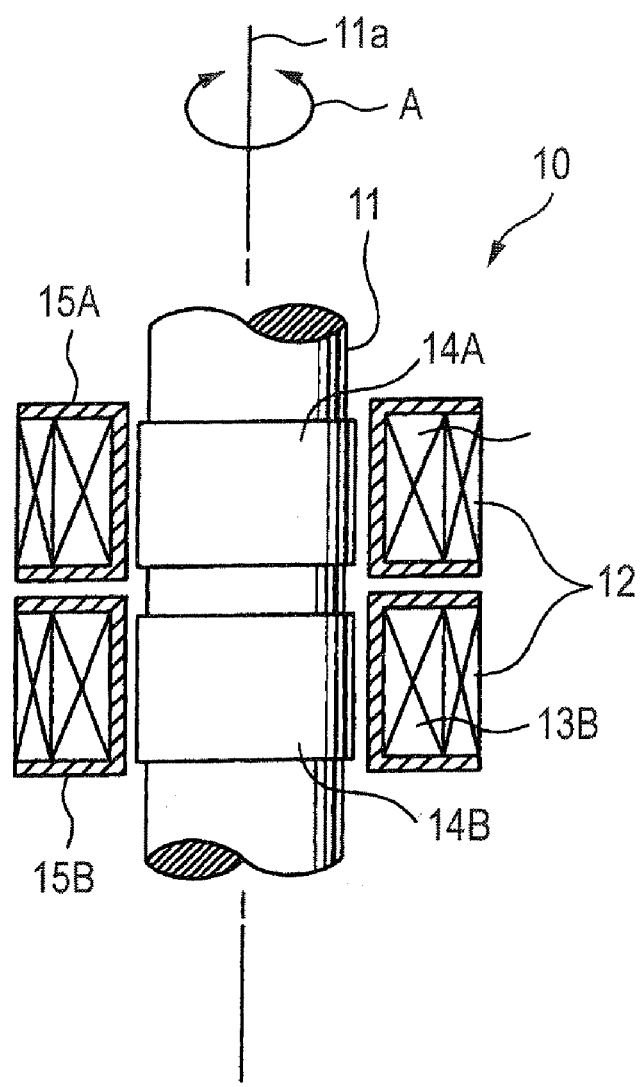
[FIG. 1]
Figure 2:
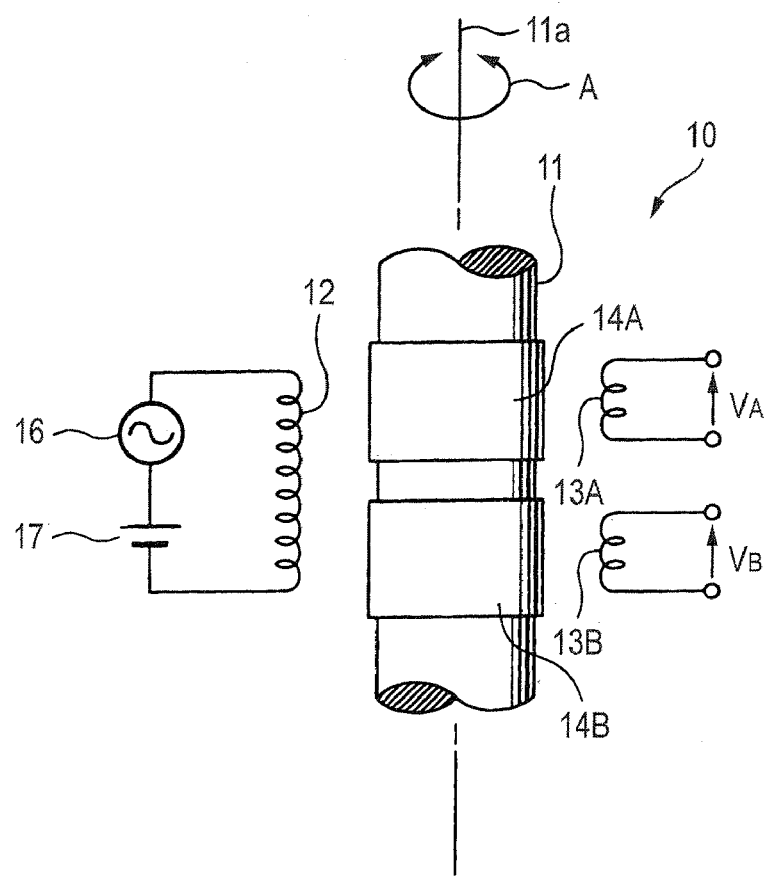
[FIG. 2]

The fundamental configuration of a magnetostrictive torque sensor according to the invention is described below with reference to FIGS. 1 and 2. FIGS. 1 and 2 illustrate an example of the configuration of the magnetostrictive torque sensor according to the invention. FIG. 1 is a partly cross-sectional side view illustrating the fundamental configuration of a magnetostrictive torque sensor according to the invention. FIG. 2 is a side view conceptually illustrating the fundamental configuration (including an electric circuit) of the magnetostrictive torque sensor.

As illustrated in FIGS. 1 and 2, a magnetostrictive torque sensor 10 includes a rotating shaft 11, one excitation coil 12 and two detection coils 13A and 13B, which are disposed around the rotating shaft 11. FIGS. 1 and 2 illustrate the rotating shaft 11 by cutting away and omitting upper and lower parts of the rotating shaft 11, for convenience of description.

The rotating shaft 11 is, for example, apart of a steering shaft of a steering system. The rotating shaft 11 receives a right rotation torque (clockwise rotation torque) for causing a clockwise rotation thereof or a left rotation torque (counterclockwise rotation torque) for causing a counterclockwise rotation thereof around a shaft center axis 11a, as indicated by arrow A. The rotating shaft 11 is formed of a metal rod made of, for example, a chrome molybdenum steel material (SCM material). As viewed in FIG. 1, magnetostrictive films 14A and 14B are provided at upper and lower two places on the shaft 11 along the direction of the shaft (shaft center line). Each of the magnetostrictive films 14A and 14B has a constant width (axial width) in an axial direction of the rotating shaft 11, and is formed over the entire circumference of the rotating shaft 11. The dimension of the axial width of each of the two magnetostrictive films 14A and 14B and that of the interval between the two magnetostrictive films 14A and 14B optionally are set according to conditions. Actually, the magnetostrictive films 14A and 14B are formed on the surface of the rotating shaft 11 as magnetostrictive plating portions by electrolytic plating processing. The magnetostrictive films 14A and 14B having magnetic anisotropies are formed thereon by performing magnetic anisotropy processing on the magnetostrictive plating portions. In FIG. 1, the film thickness of each of the magnetostrictive films 14A and 14B is slightly exaggeratingly illustrated.

A nickel-iron alloy material is used as the magnetostrictive material of each of the two magnetostrictive films 14A and 14B. The magnetic anisotropies of the two complete magnetostrictive films 14A and 14B are symmetric with the axis and are opposite to each other. One of the magnetostrictive films 14A and 14B has a positive magnetostriction constant, while the other magnetostrictive film has a negative magnetostriction constant. In the following description, it is assumed that the upper magnetostrictive film 14A has a positive magnetostriction constant, while the lower magnetostrictive film 14B has a negative magnetostriction constant.

As illustrated in FIG. 1, the excitation coil 12 and a couple of detection coils 13A and 13B are provided corresponding to the two magnetostrictive films 14A and 14B, respectively. That is, as illustrated in FIG. 1, the detection coil 13A is disposed across a gap around the magnetostrictive film 14A. The ring-like detection coil 13A surrounds the entire circumference of the magnetostrictive film 14A. In addition, the dimension of the axial width of the detection coil 13A is substantially equal to that of the magnetostrictive film 14A. The detection coil 13B is disposed across a gap around the magnetostrictive film 14B. Similarly, the ring-like detection coil 13B surrounds the entire circumference of the magnetostrictive film 14B. In addition, the dimension of the axial width of the detection coil 13B is substantially equal to that of the magnetostrictive film 14B. Moreover, the ring-like excitation coil 12 is disposed around each of the two detection coils 13A and 13B. Although FIG. 1 seems to illustrate the excitation coils 12 as being provided individually and respectively corresponding to the magnetostrictive films 14A and 14B, actually, two parts of the single excitation coil 12 are illustrated separately from each other. The detection coils 13A, 13B and the excitation coil 12 are windingly provided in a space surrounding the magnetostrictive films 14A and 14, utilizing ring-like support frame portions 15A and 15B provided around the rotating shaft 11 so as to surround the rotating shaft 11.

FIG. 2 conceptually illustrates the electrical relationship among the excitation coil 12 and the detection coils 13A and 13B, which are disposed around the magnetostrictive films 14A and 14B on the rotating shaft 11. An alternating-current power supply 16 for always supplying an excitation alternating current (alternating sinusoidal wave current) is connected to the excitation coil 12 provided in common along the magnetostrictive films 14A and 14B. In an electric circuit for supplying an excitation current to the excitation coil 12 according to the present embodiment, a bias power supply 17 for supplying a bias current ($I_0$), which is a direct current, is provided in addition to the alternating-current power supply 16. Induced voltages $V_A$ and $V_B$ respectively corresponding to torques to be detected are output from output terminals of the detection coils 13A and 13B disposed respectively corresponding to the magnetostrictive films 14A and 14B.

The magnetostrictive films 14A and 14B formed on the surface of the rotating shaft 11 by electrolytic plating processing using Ni—Fe plating have opposite magnetic anisotropies. The two magnetostrictive films 14A and 14B are formed so as to have opposite magnetic anisotropies, respectively. When a torque due to a turning force acts upon the rotating shaft 11, opposite magnetostrictive characteristics generated in the magnetostrictive films 14A and 14B are detected by utilizing the detection coils 13A and 13B provided around the magnetostrictive films 14A and 14B, respectively.

Figure 3:
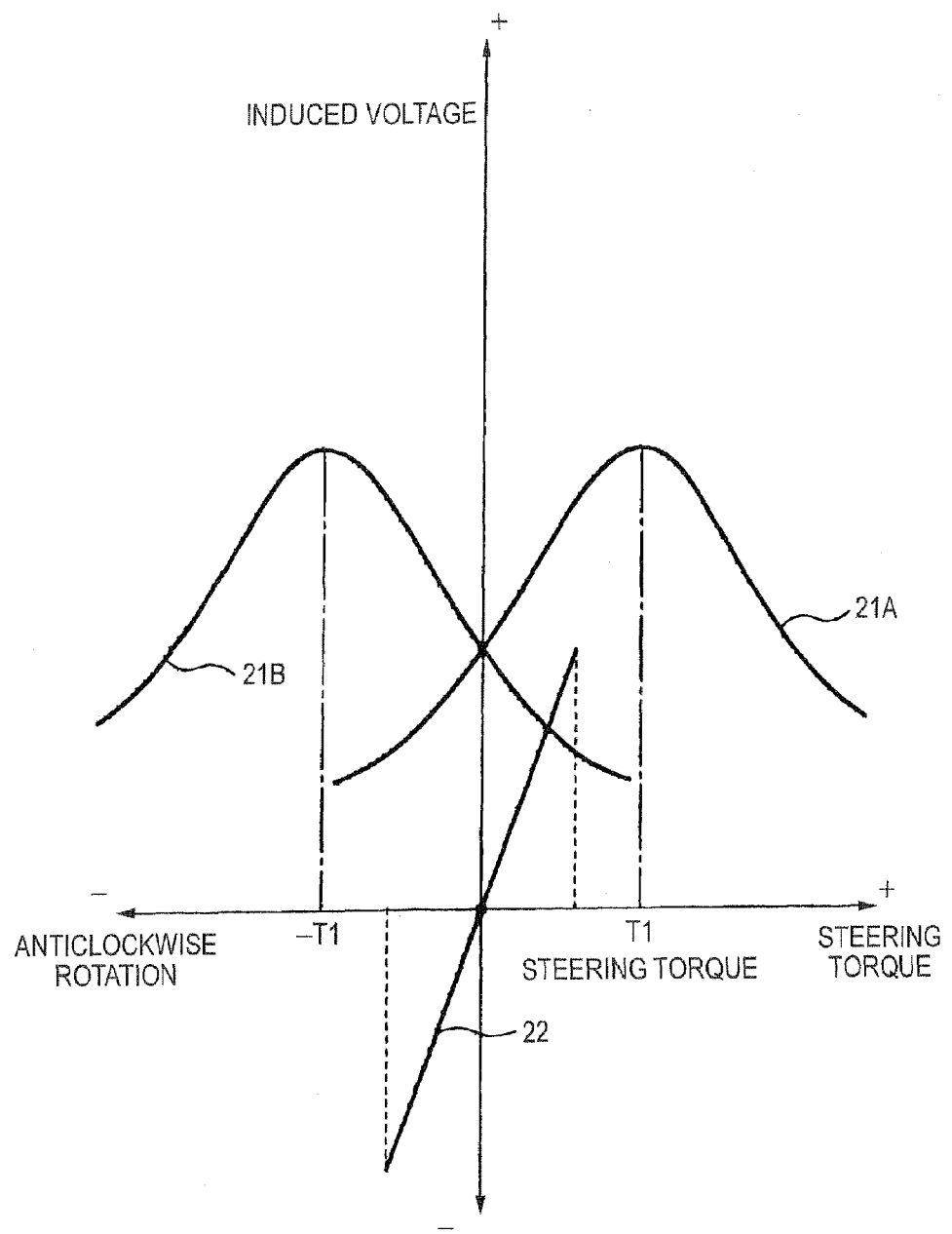
[FIG. 3]

FIG. 3 is a graph illustrating magnetostrictive characteristic curves 21A and 21B of the two magnetostrictive films 14A and 14B. In FIG. 3, an abscissa axis represents a steering torque applied to the rotating shaft (steering shaft). A positive side (+) corresponds to a clockwise rotation. A negative side (−) corresponds to a counterclockwise rotation. In FIG. 3, an ordinate axis represents a voltage axis.

The magnetostrictive characteristic curves 21A and 21B respectively corresponding to the magnetostrictive films 14A and 14B represent the detection output characteristics of the detection coils 13A and 13B. That is, excitation alternating currents are supplied to the magnetostrictive films 14A and 14B respectively corresponding to the magnetostrictive characteristic curves 21A and 21B from the common excitation coil 12. The detection coils 13A and 13B output induced voltages in response to the excitation alternating currents. Thus, a characteristic of change in the induced voltage of each of the detection coils 13A and 13B corresponds to an associated one of the magnetostrictive characteristic curves 21A and 21B respectively corresponding to the magnetostrictive films 14A and 14B. The magnetostrictive characteristic curve 21A shows the characteristic of change in the induced voltage $V_A$ output from the detection coil 13A. The magnetostrictive characteristic curve 21B shows the characteristic of change in the induced voltage $V_B$ output from the detection coil 13B.

In FIG. 3, a straight line 22 shows a graph generated according to values obtained by subtracting each value represented by the magnetostrictive characteristic curve 21B showing the output voltages of the detection coil 13B from an associated value represented by the magnetostrictive characteristic curve 21A showing the output voltages of the detection coil 13A. Regarding the characteristic graph shown by the line 22, the ordinate axis of FIG. 3 represents values of a difference voltage. As described above, each of the detection output values of the magnetostrictive torque sensor is obtained as the value of the difference ($V_A$-$V_B$) between the induced voltages $V_A$ and $V_B$ respectively output from the detection coils 13A and 13B. Thus, the direction and the magnitude of a steering torque applied to the rotating shaft 11 can be detected by relying on the line 22.

An operation of the magnetostrictive torque sensor 10 having the aforementioned configuration is described below in more detail.

In the magnetostrictive torque sensor 10, an alternating current supplied from the excitation coil 12 is a high frequency sinusoidal wave alternating current whose frequency is included in a range of frequencies substantially from about 20 to about 100 kHz. In a case where a torque is externally applied to the rotating shaft 11 when the excitation coil 12 is excited by an alternating current, an electromotive voltage including a self-induction voltage and a mutual induction voltage due to change in inductance, which is caused by change in the magnetic permeability produced in proportion to stress-strain generated on the rotating shaft 11, is generated in each of the excitation coil 12, and the detection coils 13A and 13B. Thus, induced voltages (VA, VB) are output from output terminals of the detection coils as minute voltages. At that time, a sinusoidal wave alternating-current voltage is continuingly applied to the excitation coil 12. An excited state is maintained. In a conventional magnetostrictive torque sensor, a sinusoidal wave alternating-current voltage, the midpoint of the range of which is an alternating-current voltage of 0 V, is applied to the excitation coil. However, upon delivery of the magnetostrictive torque sensors, there is variation in the magnetic permeability of the rotating shaft. In addition, because the rotating shaft is made of a magnetic material, there are individual differences in magnetization thereof. Consequently, variation in the sensitivity (or magnetic permeability) of the sensor is caused. Thus, in the magnetostrictive torque sensor 10 according to the present embodiment, a predetermined direct-current electric current ($I_0$) is further applied to the excitation coil 12 by the bias power supply 17. Consequently, a magnetic field applied to each of the magnetostrictive films 14A and 14B, which is generated when a sinusoidal wave alternating-current electric current is supplied to the excitation coil 12, is offset. The predetermined direct-current electric current is the aforementioned bias current $I_0$, and is an offset current for generating an offset magnetic field. The excitation coil 12 generates an alternating magnetic field based on the aforementioned sinusoidal wave alternating-current electric current supplied thereto. The bias current $I_0$ to be added to the sinusoidal wave alternating-current electric current generates an offset magnetic field by adding a bias magnetic field to the alternating magnetic field. Incidentally, the aforementioned bias power supply 17 can be configured to optically adjust a bias voltage.

Figure 4:
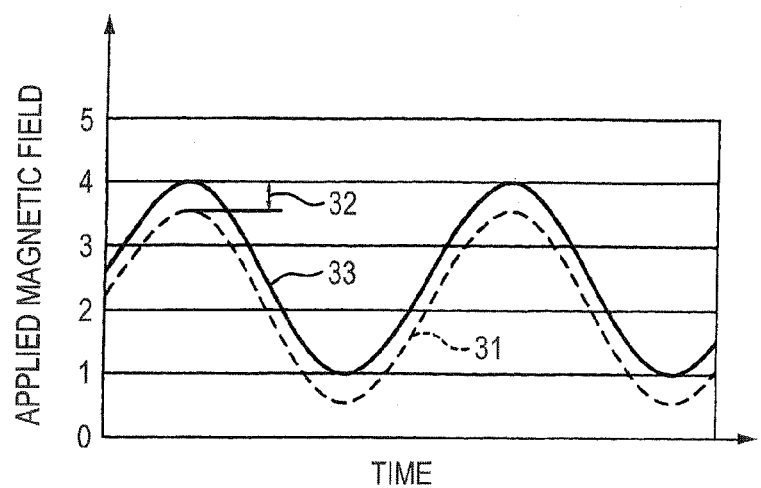
[FIG. 4]

A graph shown in FIG. 4 illustrates an example of the relationship among an alternating magnetic field 31 based on the sinusoidal wave alternating-current electric current, a bias magnetic field 32 based on the bias current $I_0$, and a resultant offset magnetic field 33 generated by the bias current $I_0$.

Conditions for offsetting the alternating magnetic field 31 shown in the aforementioned graph are determined as follows.

Figure 5:
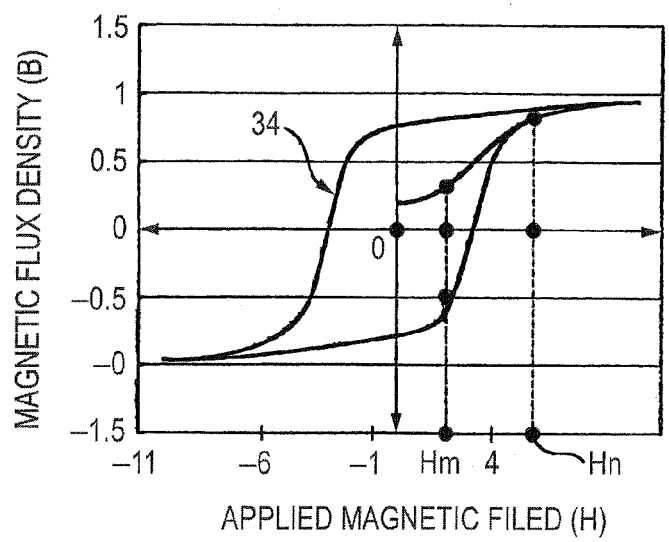
[FIG. 5]

It is assumed that as illustrated in FIG. 5, $H_m$ (>0) designates an "applied magnetic field corresponding to a maximum magnetic permeability" determined according to a magnetic hysteresis curve 34 of the magnetostrictive films 14A and 14B, which is generated by the alternating magnetic field 31, that $H_n$ (>0) designates an "applied magnetic field at which a range of performing a discontinuous magnetization is ended (or at which magnetism is saturated)", and that $H_{in}$ (>0) designates an applied magnetic field which determines a sensitivity range to be set on a magnetostrictive sensitivity curve representing a magnetostrictive sensitivity exhibited by the magnetostrictive films 14A and 14B. Under such assumptions, the bias current $I_0$ is added to the aforementioned sinusoidal alternating-current electric current so as to satisfy the following conditions:

$H_m < H_{in} < H_n$; and $-H_m > -H_{in} > -H_n$.

Figure 6:
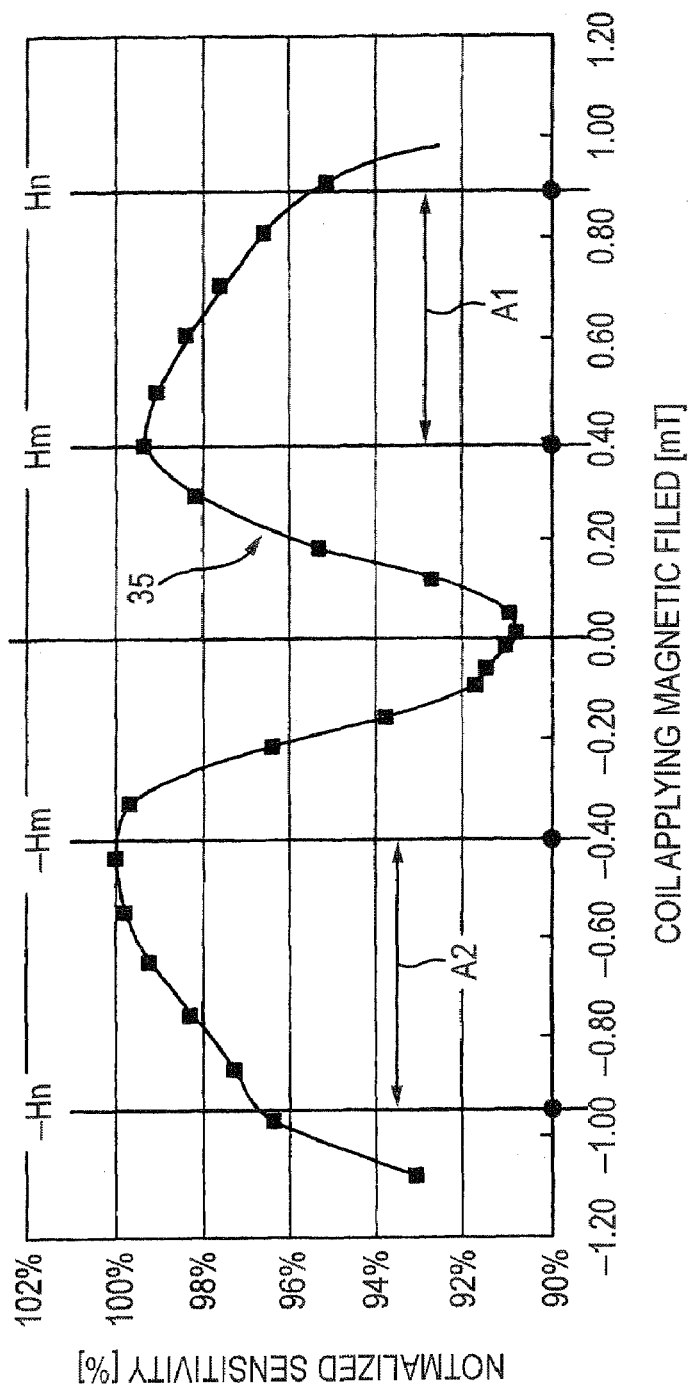
[FIG. 6]

According to the "applied-magnetic-field/normalized-sensitivity" characteristic of the aforementioned magnetostrictive films 14A and 14B, the "applied magnetic field $H_m$ corresponding to a maximum magnetic permeability" and the "applied magnetic field $H_n$ at which a range of performing a discontinuous magnetization is ended" are set, as illustrated in FIG. 6. In FIG. 6, according to the "applied-magnetic-field/normalized-sensitivity" characteristic 35, a range A1 is the range of $H_{in}$, in which the condition given by the inequality "$H_m < H_{in} < H_n$" is satisfied. A range A2 is the range of $H_{in}$, in which the condition given by the inequality "$-H_m > -H_{in} > -H_n$" is satisfied.

With the aforementioned configuration, the sensitivity characteristic of the sensor can be implemented so that variation in the sensitivity of the sensor is small at a maximum sensitivity corresponding to the maximum magnetic permeability provided by the two magnetostrictive films 14A and 14B formed on the rotating shaft 11.

The setting of the offset magnetic field 33 applied to the magnetostrictive films 14A and 14B on the rotating shaft 11 is performed based on the excitation current and the bias current, which are supplied to the excitation coil 12, at initial setting. The "initial setting" is the setting of an electric system circuit in initialization performed when the magnetostrictive torque sensor 10 is utilized in the steering torque detecting portion of an electric power steering apparatus of an automobile, for example, when the manufacture of the automobile is completed. Generally, in a case where the magnetostrictive torque sensor 10 is equipped in a given apparatus, the "initial setting" is a setting to be performed when the apparatus is carried out as a completed product.

Figure 7:
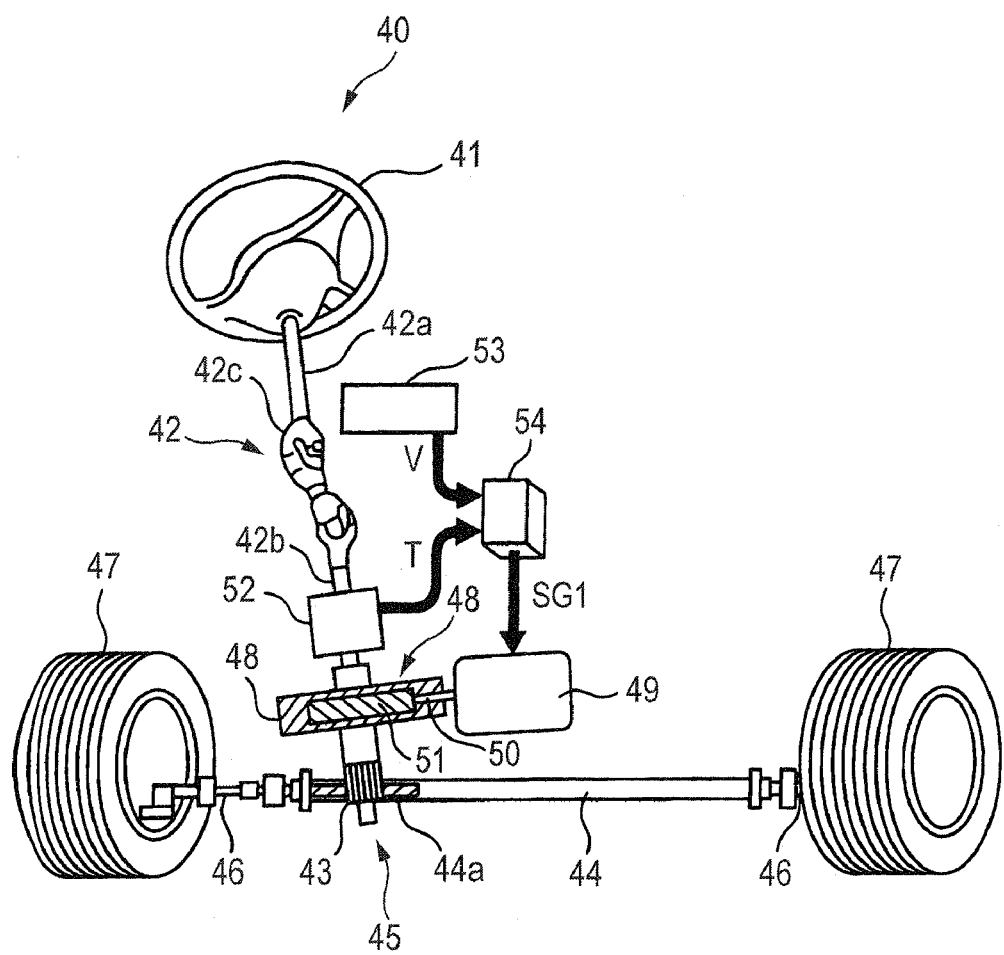
[FIG. 7]

Next, an embodiment utilizing the aforementioned magnetostrictive torque sensor 10 as a steering torque detecting portion of an electric power steering apparatus of an automobile is described below. FIG. 7 schematically illustrates the entire configuration of the electric power steering apparatus to be equipped in the automobile.

An electric power steering apparatus 40 is configured to give an assist torque to a steering shaft 42 connected to a steering wheel 41. The steering shaft 42 includes an upper steering shaft 42a whose top end is connected to the steering wheel 41, a lower steering shaft 42b, at the bottom of which a pinion gear 43 is provided, and a universal coupling 42c that connects the upper steering shaft 42a and the lower steering shaft 42b to each other. A rack shaft 44 is provided with a rack gear 44a meshing with the pinion gear 43 of the lower steering shaft 42b. A rack-and-pinion mechanism 45 is formed of the pinion gear 43 and the rack shaft 44 (rack gear 44a). Tierods 46 are provided at both ends of the rack shaft 44. A front wheel 47 is attached to an outer end of an associated one of the tierods 46.

A motor 49 is attached to the lower steering shaft 42b via a power transmission mechanism 48. The power transmission mechanism 48 is formed of a worm gear 50 and a worm wheel 51. The motor 49 outputs a turning force (torque) assisting a steering torque, and gives the turning force to the steering shaft 42b via the power transmission mechanism 48.

A steering torque detecting portion 52 is provided on a steering shaft 42b. The steering torque detecting portion 52 detects, when a driver operates the steering wheel 41 and applies a steering torque to the steering shaft 42, the steering torque applied to the steering shaft 42.

Reference numeral 53 designates a vehicle speed detecting portion for detecting a vehicle seed of an automobile. Reference numeral 54 denotes a control apparatus including a computer. The control apparatus 54 takes in a steering torque signal T output from the steering torque detecting portion 52, and outputs also a vehicle speed signal V output from the vehicle speed detecting portion 53. Then, the control apparatus 54 outputs a drive control signal SG1 for controlling an operation of the motor 49, based on information concerning the steering torque, and information concerning the vehicle speed.

When a driver operates the steering wheel 41 to perform steering in a running direction while a vehicle drives, a turning force based on a steering torque applied to the steering shaft 42 is converted into an axial linear motion of the rack shaft 44 via the rack-and-pinion mechanism 45. Further, the running direction of the front wheels 47 can be changed via the tierods 46. At that time, the steering torque detecting portion 52 annexed to the steering shaft 42 simultaneously detects a steering torque in response to a driver's steering operation to the steering wheel 41 and converts the detected steering torque into an electric steering torque signal T. Then, the steering torque detecting portion 52 outputs the steering torque signal T to the control apparatus 54. On the other hand, the vehicle speed detecting portion 53 detects a vehicle speed and converts the detected vehicle speed into a vehicle speed signal V. The control apparatus 54 generates a motor current for driving the motor 49 according to the steering torque signal T and the vehicle speed signal V. The motor 49 to be driven according to the motor current causes an assist steering force to act upon the steering shaft 42b via the power transmission mechanism 48. Thus, a driver's steering force to be applied to the steering wheel 41 is reduced by driving the motor 49.

In a case where the aforementioned magnetostrictive sensor 10 is used as the steering torque detecting portion 52 of the electric power steering apparatus 40 of the automobile, as described above, significant change of the magnetic field environment in the use environment occurs. For example, in a case where an automobile crosses a railway crossing, and where an automobile travels underneath elevated railway tracks, the automobile is affected by a magnetic field. Additionally, earth magnetism varies with a region in which the magnetostrictive torque sensor is used. Thus, it is necessary to take the influence of change of the earth magnetism into consideration.

Figure 8:
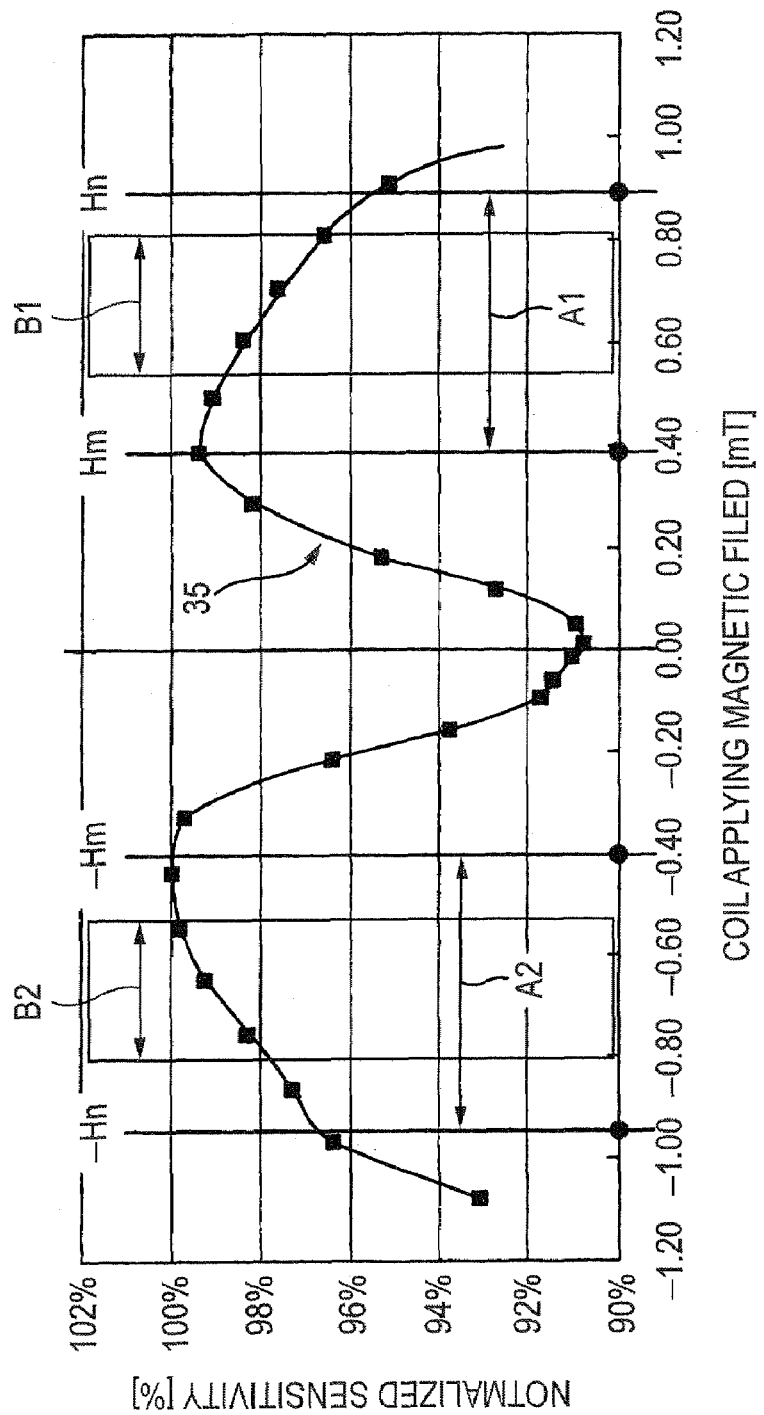
[FIG. 8]

Thus, in a case where the magnetostrictive sensor 10 is used in the electric power steering apparatus 40 of an automobile, preferably, a bias current is added to the aforementioned sinusoidal wave alternating-current electric current so that the range of the aforementioned applied magnetic field $H_{in}$ (>0) satisfies the following conditions:

$$(H_m + H_{ex} + H_{mag}) < H_{in} < (H_n - H_{ex} - H_{mag}); \text{ and}$$

$$-(H_m + H_{ex} + H_{mag}) > -H_{in} > -(H_n - H_{ex} - H_{mag})$$

where $H_{ex}$ (>0) is a magnetic field due to a disturbance element, particularly, a magnetic field caused when an automobile crosses a railway crossing, and a magnetic field due to initial magnetism of the rotating shaft, and $H_{mag}$ (>0) is a magnetic field due to earth magnetism. This is the range of Hin where, in the "applied-magnetic-field/normalized-sensitivity" characteristic 35 in FIG. 8 which is similar to FIG. 6, the range B1 satisfies the condition: $(H_m + H_{ex} + H_{mag}) < H_{in} < (H_n - H_{ex} - H_{mag})$; and the range B2 satisfies the condition: $-(H_m + H_{ex} + H_{mag}) > -H_{in} > -(H_n - H_{ex} - H_{mag})$. In a case where the offset magnetic field is set in this way, the influence of the magnetic-filed disturbance element and the characteristic parameters, such as earth magnetism, can be reduced. Consequently, magnetostrictive torque sensors with less-variation in the magnetic permeability and the sensitivity can be obtained.

Figure 9:
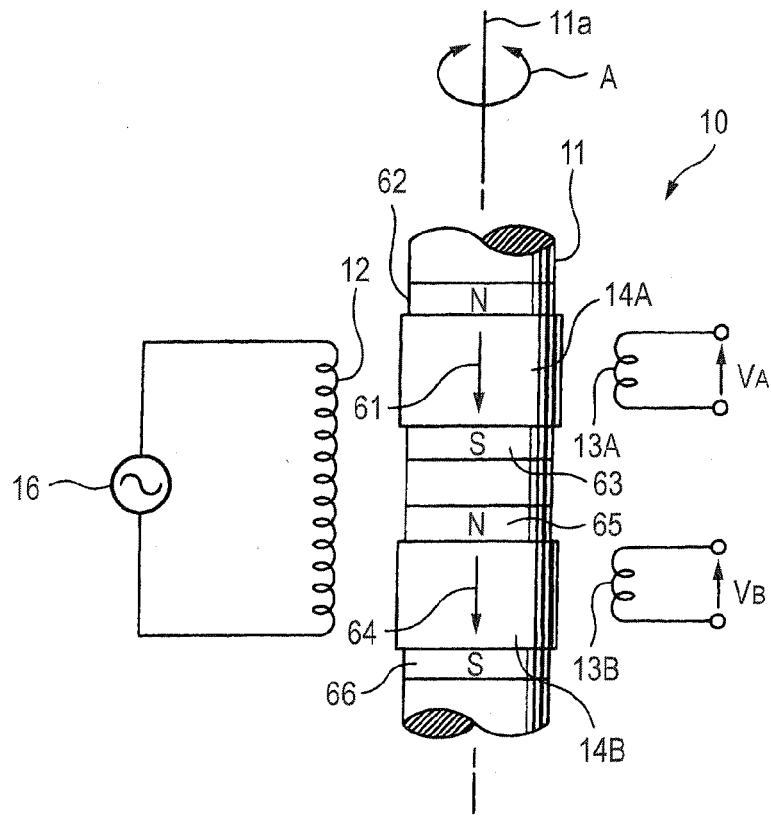
[FIG. 9]
Figure 10:
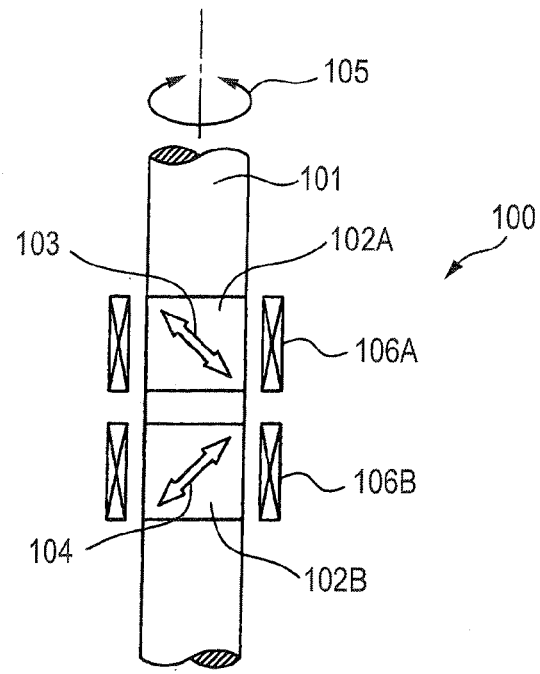
[FIG. 10]
Figure 11:
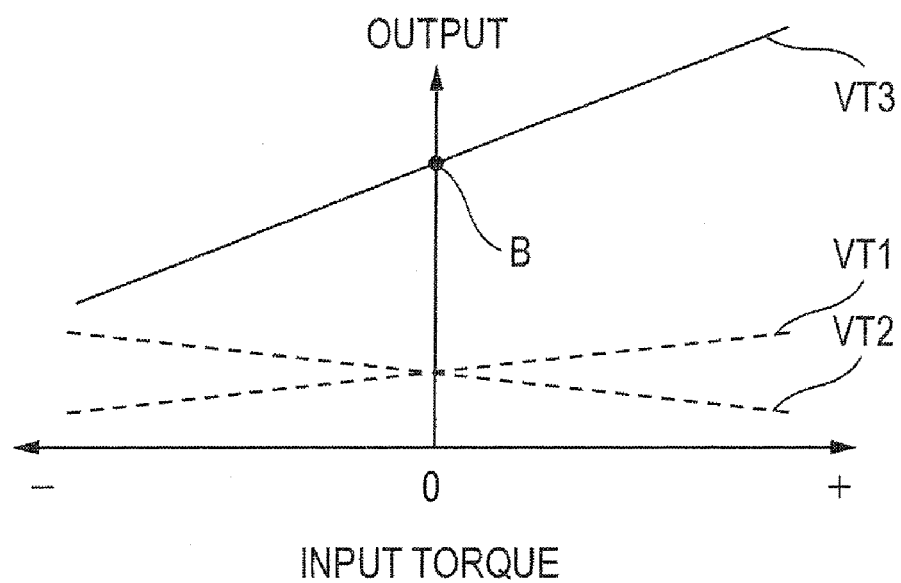
[FIG. 11]

In the aforementioned embodiment, a direct current (bias current) is applied to the excitation coil 12 so as to apply the offset magnetic field (or bias magnetic field) to the magnetostrictive films 14A and 14B on the rotating shaft 11. In order to apply an offset magnetic field (or bias magnetic field) of a predetermined width to the magnetostrictive films 14A and 14B, a method of applying a magnetic field directly to the rotating shaft 11 by annexing another magnetic field generating apparatus thereto, as illustrated in FIG. 9, can be performed. FIG. 9 is similar to the aforementioned FIG. 2. In FIG. 9, an element, which is substantially the same as that described with reference to FIG. 2, is designated with the same reference numeral as that used to denote the same element shown in FIG. 2. Thus, the description of such an element is omitted. In the configuration illustrated in FIG. 9, a ring-like N-pole permanent magnet 62 and a ring-like S-pole permanent magnet 63 are provided on both sides in the axial direction of the magnetostrictive film 14A so that a magnetic field as indicated by arrow 61 is generated in a region provided along the magnetostrictive surface. Similarly, ring-like N-pole permanent magnet 65 and a ring-like S-pole permanent magnet 66 are provided on both sides in the axial direction of the magnetostrictive film 14B so that a magnetic field as indicated by arrow 64 is generated in a region provided along the magnetostrictive surface. The direction of the magnetic field 61 is the same as that of the magnetic field 64 and is parallel to the axial direction of the rotating shaft 11. The N-pole permanent magnets 62, 65 and the S-pole permanent magnets 63, 66 constitute a magnetic field generating apparatus. The N-pole permanent magnets 62, 65 and the S-pole permanent magnets 63, 66, each of which is shaped like a ring in the circumferential direction of the rotating shaft 11 adjust the generated magnetic field by changing the volume of each of the N-pole permanent magnets 62, 65 and the S-pole permanent magnets 63, 66. Thus, an optimal applied magnetic field can be determined. In this example of the configuration, only the alternating-current power supply 16 is connected to the excitation coil 12. In the case of this configuration, the offset magnetic field (bias magnetic field) is irrelevant to the excitation coil. Thus, the range of the magnetic field can be determined by eliminating the influence of, for example, the number of windings of the coil and a resistance value thereof.

The configuration, the shape, the size, the material, and the arrangement relationship of the components described in the aforementioned embodiment are only roughly illustrated to the extent that the invention can be understood and implemented. Therefore, the invention is not limited to the described embodiment. Consequently, the invention can be changed to various manners without departing from the scope of the technical idea described in the appended claims.

According to the invention, a magnetostrictive torque sensor to be used as a steering torque detecting portion of an electric power steering apparatus is utilized for simplifying the manufacturing process thereof.

What is claimed is:

1. A magnetostrictive torque sensor comprising:
   a rotating shaft that is used to rotate according to an input torque and that is provided with a magnetostrictive film,
   an excitation coil that applies an alternating magnetic field to the magnetic film, and
   a detection coil that detects a change in a magnetic characteristic of the magnetostrictive film, wherein
   a bias magnetic field is added to the alternating magnetic field so as to satisfy the following conditions:

$H_m < H_{in} < H_n$; and $-H_m > -H_{in} > -H_n$ where $H_m$ (>0) is an applied magnetic field corresponding to a maximum magnetic permeability obtained according to a magnetic hysteresis curve of the magnetostrictive film, which shows magnetization caused by the alternating magnetic field,
   $H_n$ (>0) is an applied magnetic field corresponding to an end of a range in which a discontinuous magnetization is performed, and
   $H_{in}$ (>0) is an applied magnetic field that determines a sensitivity range to be set on a magnetostrictive sensitivity curve representing a magnetostrictive sensitivity exhibited by the magnetostrictive film.

2. The magnetostrictive torque sensor according to claim 1, wherein
   the bias magnetic field is added thereto so as to satisfy the following conditions:

$(H_m + H_{ex} + H_{mag}) < H_{in} < (H_n - H_{ex} - H_{mag})$; and $-(H_m + H_{ex} + H_{mag}) > -H_{in} > -(H_n - H_{ex} - H_{mag})$ where $H_{ex}$ (>0) is a magnetic field due to a disturbance element capable of affecting a magnetic characteristic of the magnetostrictive film, and
   $H_{mag}$ (>0) is a magnetic field due to earth magnetism.

3. The magnetostrictive torque sensor according to claim 1, wherein
   the bias magnetic field is given via the excitation coil by adding a bias current to the alternating current.

4. The magnetostrictive torque sensor according to claim 1, wherein
   the bias magnetic field is given by another magnetic field generator.

5. An electric power steering apparatus comprising:
   a steering torque detecting portion for detecting a steering torque applied to a steering shaft of the steering apparatus, and
   a controller that drive-controls a motor which gives an assist torque to the steering shaft according to a steering torque detected by the steering torque detecting protion, wherein
   the magnetostrictive torque sensor according to any one of claims 1 to 4 is used as the steering torque detecting portion, and
   the steering shaft serves as the rotating shaft of the magnetostrictive torque sensor.

* * * * *